(12) United States Patent
Ni

(10) Patent No.: US 11,791,697 B2
(45) Date of Patent: Oct. 17, 2023

(54) BRUSHLESS DIRECT-CURRENT SPEED REGULATION SWITCH WITH HIGHLY INTEGRATED STRUCTURE

(71) Applicant: ZHEJIANG JIABEN ELECTRONICS CO., LTD., Yueqing (CN)

(72) Inventor: Shenglong Ni, Yueqing (CN)

(73) Assignee: ZHEJIANG JIABEN ELECTRONICS CO., LTD., Zhejiang (CN)

( * ) Notice: Subject to any disclaimer, the term of this patent is extended or adjusted under 35 U.S.C. 154(b) by 14 days.

(21) Appl. No.: 17/533,738

(22) Filed: Nov. 23, 2021

(65) Prior Publication Data

US 2022/0166291 A1    May 26, 2022

(30) Foreign Application Priority Data

Nov. 25, 2020 (CN) .......................... 202011337643.7

(51) Int. Cl.
*H02K 11/38* (2016.01)
*H02K 5/04* (2006.01)

(52) U.S. Cl.
CPC ............... *H02K 11/38* (2016.01); *H02K 5/04* (2013.01)

(58) Field of Classification Search
CPC .......... H02K 11/38; H02K 5/04; H02K 7/145; H02K 11/28; H02K 11/33; H02K 5/225; H02K 5/24; H02K 11/0094; H02K 11/30; H02K 13/00; H02P 6/08
See application file for complete search history.

(56) References Cited

U.S. PATENT DOCUMENTS

| | | | | |
|---|---|---|---|---|
| 8,071,903 B2 * | 12/2011 | Sato | ....................... | H01H 13/06 200/522 |
| 2018/0056497 A1 * | 3/2018 | Chen | ....................... | B24B 23/02 |

FOREIGN PATENT DOCUMENTS

| | | | | | |
|---|---|---|---|---|---|
| CN | 108696211 A | * | 10/2018 | ................ | H02P 7/00 |
| CN | 109801799 A | * | 5/2019 | | |
| CN | 110060893 A | * | 7/2019 | | |

OTHER PUBLICATIONS

CN-110060893-A_translate (Year: 2019).*
CN-109801799-A_translate (Year: 2019).*
CN-108696211-A_translate (Year: 2018).*

* cited by examiner

*Primary Examiner* — Tulsidas C Patel
*Assistant Examiner* — Mohammed Ahmed Qureshi
(74) *Attorney, Agent, or Firm* — Ohlandt, Greeley and Perle, LLP

(57) ABSTRACT

A brushless direct-current speed regulation switch with a highly integrated structure. The brushless direct-current speed regulation switch comprises a base body, a bottom cover and a push shaft; a moving contact assembly in contact with the push shaft is arranged below the push shaft, a moving elastic sheet, a moving contact support for supporting the moving contact assembly and a static contact pin assembly matched with the moving contact assembly are arranged below the moving contact assembly, one end of the moving elastic sheet is connected with the moving contact assembly, and the other end of the moving elastic sheet is connected with the moving contact support; a circuit board assembly is arranged on one side of the push shaft, and a connecting reed and a speed regulation reed which can slide on the circuit board assembly are arranged between the circuit board assembly and the push shaft.

5 Claims, 5 Drawing Sheets

BRUSHLESS DIRECT-CURRENT SPEED REGULATION SWITCH WITH HIGHLY INTEGRATED STRUCTURE

CROSS REFERENCE TO RELATED APPLICATION(S)

This patent application claims the benefit and priority of Chinese Patent Application No. 202011337643.7, filed on Nov. 25, 2020, the disclosure of which is incorporated by reference herein in its entirety as part of the present application.

TECHNICAL FIELD

The present disclosure relates to a speed regulation switch, and particularly relates to a brushless direct-current speed regulation switch with a highly integrated structure.

BACKGROUND ART

Brushless direct-current tools in the current market realize various control and protection functions generally through a scheme that a brushless direct-current signal switch and a control panel assembly are adopted, and the scheme has the following defects:

firstly, a common brushless direct-current switch is internally provided with a simple potentiometer only and has on-off and reversing functions, a control panel assembly is connected outside the switch, a large space of a machine shell needs to be occupied, many connecting wires between the brushless direct-current switch and a control panel module exist, and therefore an electric tool is complex in assembling process and low in production efficiency; and secondly, wires between the brushless direct-current switch and the control panel assembly, especially control wires, are very small in wire diameter and are easy to break in the assembling process of the electric tool, if the functions of the electric tool are affected in the connecting process of the wires, part of the wires are unreliable in connection in serious cases, and when the electric tool is held for high-altitude operation, sudden functional abnormity may cause high-altitude falling of the electric tool, has great hidden dangers to personal safety, and does not meet the requirements of GB15092 national standards.

Therefore, it is imperative to design a brushless direct-current speed regulation switch with a highly integrated structure.

SUMMARY

The present disclosure aims to overcome the disadvantages in the prior art, and provides a brushless direct-current speed regulation switch with a highly integrated structure.

According to the brushless direct-current speed regulation switch with a highly integrated structure provided by the present disclosure, the direct-current speed regulation switch comprises a base body, a bottom cover and a push shaft, wherein one end of the push shaft is arranged in a box body composed of the base body and the bottom cover, and the other end of the push shaft extends out of the box body;

a moving contact assembly in contact with the push shaft is arranged below the push shaft, a moving elastic sheet, a moving contact support for supporting the moving contact assembly and a static contact pin assembly matched with the moving contact assembly are arranged below the moving contact assembly, one end of the moving elastic sheet is connected with the moving contact assembly, and the other end of the moving elastic sheet is connected with the moving contact support;

a circuit board assembly is arranged on one side of the push shaft, and a connecting reed and a speed regulation reed which can slide on the circuit board assembly are arranged on the side, close to the circuit board assembly, of the push shaft; and the moving contact support and the static contact pin assembly are respectively welded with different welding spots on the circuit board assembly.

The present discourse provides a brushless direct-current speed regulation switch with a highly integrated structure, and also has the following technical scheme:

Wherein, a sliding sheet capable of sliding on the moving contact support is arranged at the bottom of the push shaft, a moving spring is arranged between the sliding sheet and the push shaft, one end of the moving spring abuts against the sliding sheet, and the other end of the moving spring abuts against the push shaft; and the sliding sheet and the moving spring can move along with the push shaft.

Wherein, two grooves are formed in the bottom of the push shaft, each groove is internally provided with a clamping block, and the two ends of the sliding sheet are clamped into the grooves through the clamping blocks respectively; and a mounting hole is further formed in the bottom of the push shaft, and one end of the moving spring extends into the mounting hole.

Wherein, a base body groove is formed, corresponding to the position between the moving contact assembly and the static contact pin assembly, on the outer side of the base body, and the base body groove is internally provided with a magnet.

Wherein, a reversing sliding block matched with the circuit board assembly is arranged above the push shaft, a reversing deflector rod matched with the reversing sliding block is arranged above the reversing sliding block, and a positioning elastic sheet matched with the reversing deflector rod is arranged at the tail part of the reversing deflector rod; and a reversing reed is arranged on the side, close to the circuit board assembly, of the reversing sliding block.

Wherein, an inclined groove is formed in the reversing sliding block, a protrusion is arranged at the bottom of the reversing deflector rod, and the protrusion can slide in the inclined groove; and a V-shaped groove is formed in the positioning elastic sheet, and an inverted hook matched with the V-shaped groove is arranged at the tail part of the reversing deflector rod.

Wherein, a control part circuit of the direct-current speed regulation switch is integrated on one side, close to the push shaft, of the circuit board assembly, and the control part circuit comprises a capacitor, a resistor, an inductor, a thermistor, an LED output, a control integrated chip and an MOS transistor.

Wherein, the side, away from the push shaft, of the circuit board assembly is provided with MOS transistor cooling fins.

Wherein, the direct-current speed regulation switch also comprises a small cover, a reset spring and a positioning column used for supporting the reset spring; and the small cover is clamped on the bottom cover and is used for crimping the circuit board assembly, and the reset spring is arranged on the push shaft.

The brushless direct-current speed regulation switch has the following technical effects:

firstly, according to the novel brushless direct-current speed regulation switch, an intelligent speed regulation function and a control protection function are integrated on a circuit board in the switch, so that the assembly process of an electric tool becomes very simple;

secondly, according to the novel brushless direct-current speed regulation switch, after the assembly is completed, the circuit board assembly is pressed by the small cover, so that electronic components are prevented from falling off due to vibration in the using process of the electric tool;

thirdly, the switch is novel in structure and high in integration level, has vibration attenuation, can be widely applied to various direct-current brushless charging type electric tools such as direct-current brushless charging type electric drills and direct-current brushless charging type electric wrenches, and meets the national safety standard; and fourthly, the brushless direct-current speed regulation switch with a highly integrated structure does not need to be externally connected with other control boards, so that wires in the electric tool are very few, only two input wires, three output wires, an external battery temperature detection wire, an LED output wire and other output wires are needed, and the assembly process of the electric tool is greatly simplified. In addition, a signal line socket (programming interface) is also exposed out of the switch, and after a matched plug is plugged, program in the switch can be read and changed at any time, so that the program in the switch is very convenient to modify and read.

Figure 1:
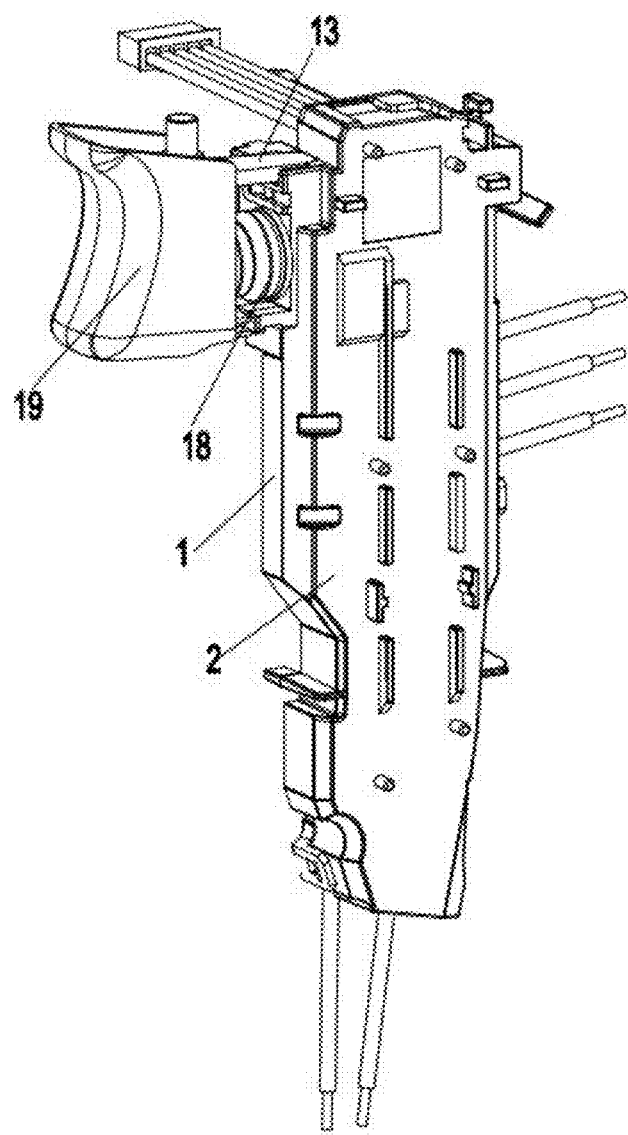
FIG. 1 is a space diagram of a brushless direct-current speed regulation switch with a highly integrated structure in the present disclosure.

Reference signs: 1, base body; 2, bottom cover; 3, push shaft; 4, moving contact assembly; 5, moving contact support; 6, static contact pin assembly; 7, circuit board assembly; 8, connecting reed; 9, speed regulation reed; 10, sliding sheet; 11, moving spring; 12, reversing sliding block; 13, reversing deflector rod; 14, positioning elastic sheet; 15, small cover; 16, reset spring; 17, positioning column; 18, dustproof cover; 19, trigger; 20, reversing reed; 101, base body groove; 102, magnet; 41, moving elastic sheet; 121, inclined groove; 131, protrusion; 132, inverted hook; 141, V-shaped groove; and 31, mounting hole.

DETAILED DESCRIPTION OF THE EMBODIMENTS

The present disclosure is described in detail in conjunction with the attached figures and specific embodiments. It needs to be noted that the described embodiments are only intended to explain the present disclosure, but not to limit the present disclosure. The orientations described in the present application, such as upper, lower, left, right directions, are used for convenience of description with reference to the attached figures, but are not intended to limit the protection scope of the present disclosure.

According to the brushless direct-current speed regulation switch with a highly integrated structure provided by the present disclosure, as shown in FIG. 1 to FIG. 4, the direct-current speed regulation switch comprises a base body 1, a bottom cover 2 and a push shaft 3, wherein one end of the push shaft 3 is arranged in a box body composed of the base body 1 and the bottom cover 2, and the other end of the push shaft extends out of the box body;

a moving contact assembly 4 in contact with the push shaft 3 is arranged below the push shaft 3, a moving elastic sheet 41, a moving contact support 5 for supporting the moving contact assembly 4 and a static contact pin assembly 6 matched with the moving contact assembly 4 are arranged below the moving contact assembly 4, one end of the moving elastic sheet 5 is connected with the moving contact assembly 4, and the other end of the moving elastic sheet is connected with the moving contact support 5;

a circuit board assembly 7 is arranged on one side of the push shaft 3, and a connecting reed 8 and a speed regulation reed 9 which can slide on the circuit board assembly 7 are arranged on the side, close to the circuit board assembly 7, of the push shaft 3; and the moving contact support 5 and the static contact pin assembly 6 are respectively welded with different welding spots on the circuit board assembly 7.

According to the novel brushless direct-current speed regulation switch, an intelligent speed regulation function and a control protection function are integrated on a circuit board in the switch, so that the assembly process of an electric tool becomes very simple. In addition, the switch is novel in structure and high in integration level, has vibration attenuation, can be widely applied to various direct-current brushless charging type electric tools such as direct-current brushless charging type electric drills and direct-current brushless charging type electric wrenches, and meets the national safety standard. Moreover, the brushless direct-current speed regulation switch with a highly integrated structure does not need to be externally connected with other control boards, so that wires in the electric tool are very few, only two input wires, three output wires, an external battery temperature detection wire, an LED output wire and other output wires are needed, and the assembly process of the electric tool is greatly simplified. Furthermore, a signal line socket (programming interface) is also exposed out of the switch, and after a matched plug is plugged, program in the switch can be read and changed at any time, so that the program in the switch is very convenient to modify and read.

Figure 2:
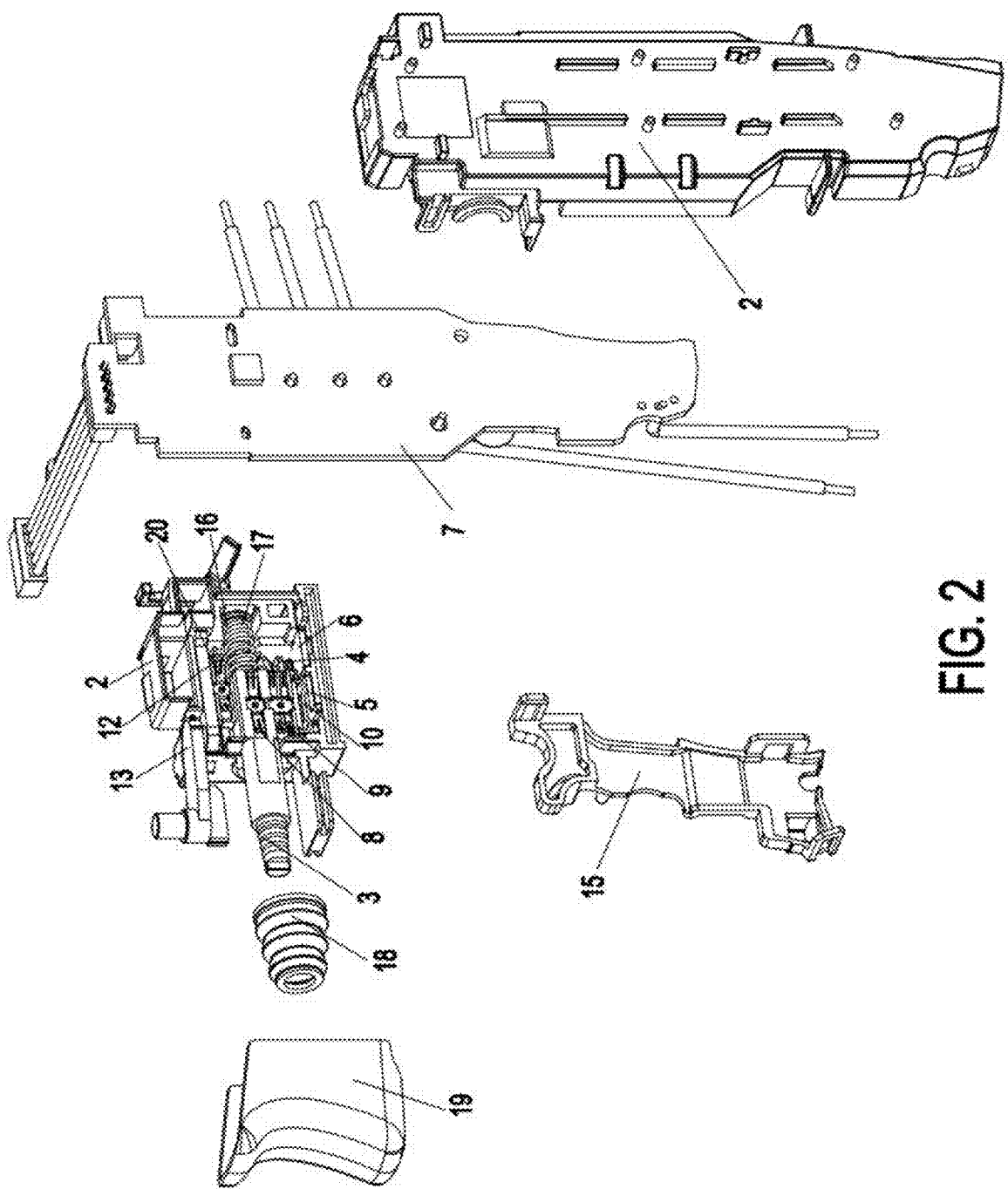
FIG. 2 is a local exploded view of a brushless direct-current speed regulation switch with a highly integrated structure in the present disclosure.
Figure 3:
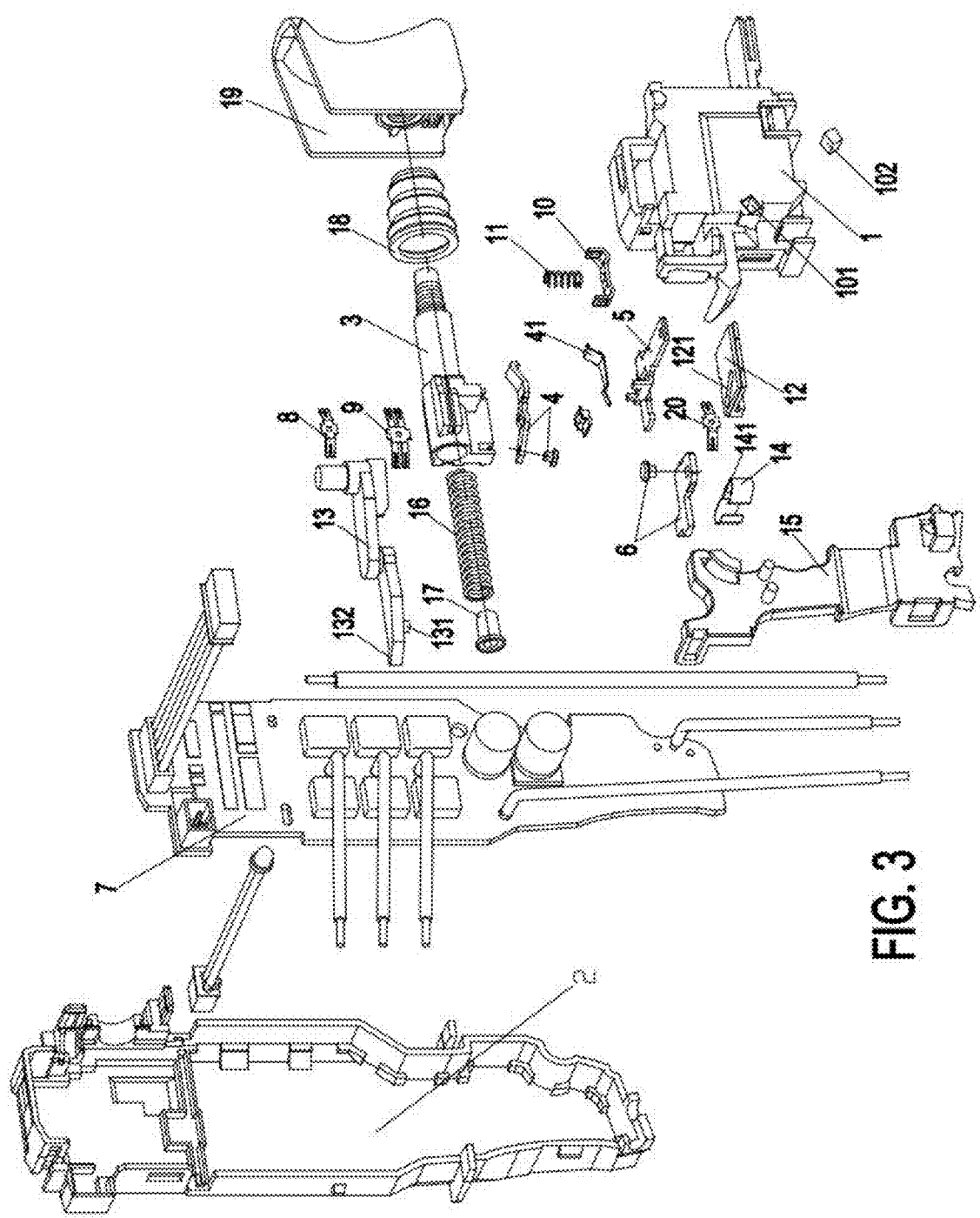
FIG. 3 is an exploded view of a brushless direct-current speed regulation switch with a highly integrated structure in the present disclosure.
Figure 4:
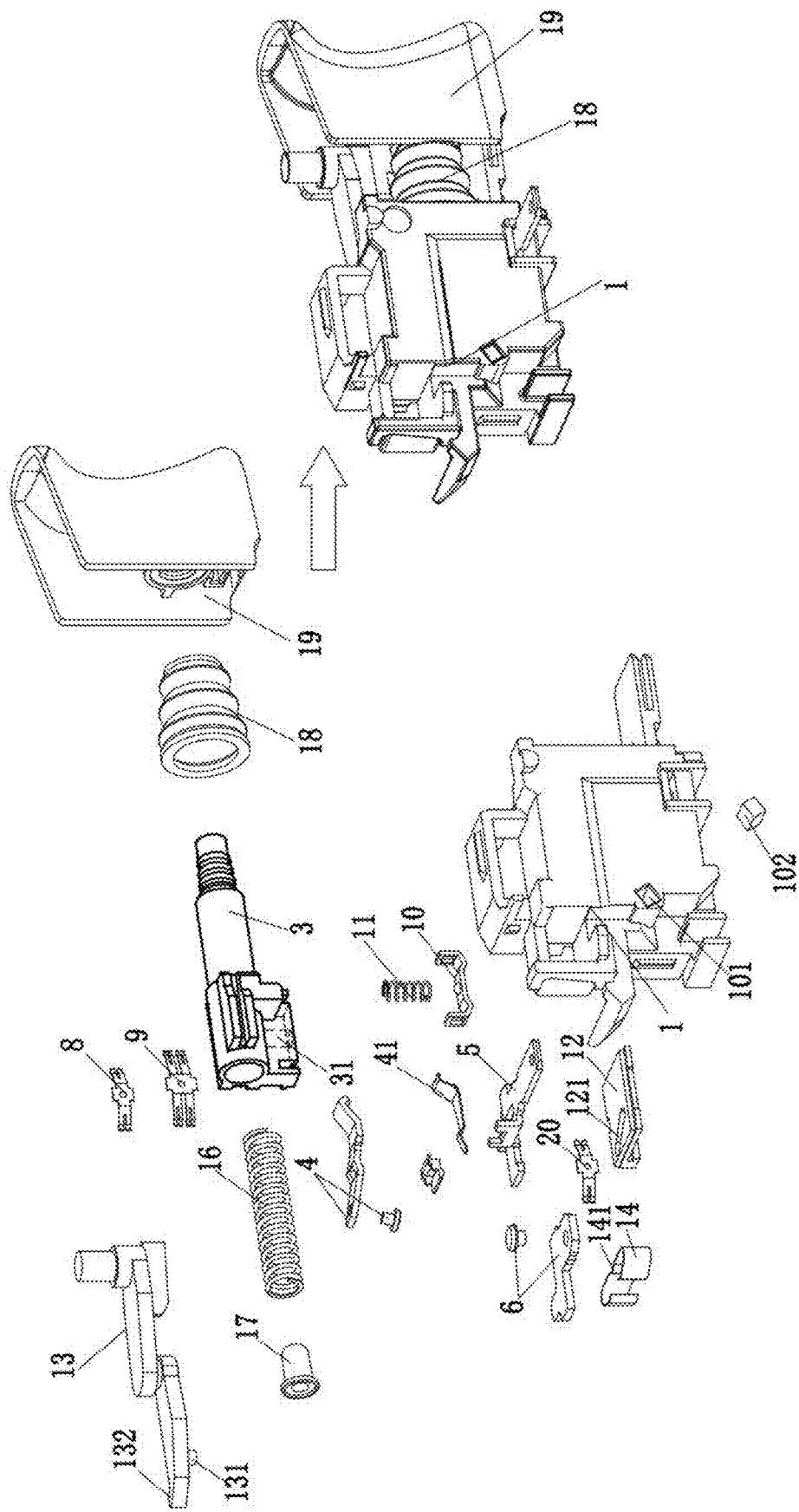
FIG. 4 is a local assembly diagram of a brushless direct-current speed regulation switch with a highly integrated structure in the present disclosure.

In one embodiment, as shown in FIG. 2 to FIG. 4, a sliding sheet 10 capable of sliding on the moving contact support 5 is arranged at the bottom of the push shaft 3, a moving spring 11 is arranged between the sliding sheet 10 and the push shaft 3, one end of the moving spring 11 abuts against the sliding sheet 10, and the other end of the moving spring abuts against the push shaft 3.

In the embodiment, the sliding sheet 10 is driven by the push shaft 3 to slide, so that the moving contact support 5 and the static contact pin assembly 6 are connected through the sliding sheet 10, the switch in the embodiment achieves an auxiliary switch-on function, and then the switch in the embodiment can bear larger current without being scalded.

Preferably, two grooves are formed in the bottom of the push shaft 3, each groove is internally provided with a clamping block, and the two ends of the sliding sheet 10 are clamped into the grooves through the clamping blocks respectively; and a mounting hole 31 is further formed in the bottom of the push shaft 3, and one end of the moving spring 11 extends into the mounting hole 31.

Preferably, as shown in FIG. 3 and FIG. 4, a base body groove 101 is formed, corresponding to the position between the moving contact assembly and the static contact pin assembly, on the outer side of the base body, and the base body groove 101 is internally provided with a magnet 102.

In the embodiment, the base body groove 101 is formed in the outer side of the base body 1, and meanwhile the base body groove 101 is internally provided with the magnet 102, so that the brushless direct-current speed regulation switch provided by the embodiment can have an arc extinguishing function when the switch is switched on.

Preferably, as shown in FIG. 3 and FIG. 4, a reversing sliding block 12 matched with the circuit board assembly 7 is arranged above the push shaft 3, a reversing deflector rod 13 matched with the reversing sliding block 12 is arranged above the reversing sliding block 12, and a positioning elastic sheet 14 matched with the reversing deflector rod 13 is arranged at the tail part of the reversing deflector rod 13; and a reversing reed 20 is arranged on the side, close to the circuit board assembly 7, of the reversing sliding block 12.

In the embodiment, by arranging the structures such as a reversing block matched with the circuit board assembly 7 above the push shaft 3, the switch in the embodiment has a reversing effect.

As shown in FIG. 3 and FIG. 4, an inclined groove 121 is formed in the reversing sliding block 12, a protrusion 131 is arranged at the bottom of the reversing deflector rod 13, and the protrusion can slide in the inclined groove; and a V-shaped groove 141 is formed in the positioning elastic sheet 14, and an inverted hook 132 matched with the V-shaped groove 141 is arranged at the tail part of the reversing deflector rod 13.

In the embodiment, an inclined groove 121 is formed in the reversing sliding block 12, meanwhile, the protrusion 131 is arranged at the bottom of the reversing deflector rod 13, and the protrusion 131 can slide in the inclined groove 121, so that the reversing deflector rod 13 in the embodiment drives the reversing reed 20 arranged on the reversing sliding block to slide on the circuit board assembly 7.

Preferably, the protrusion 131 may be arranged to be a cylindrical protrusion to reduce friction between the protrusion and the inclined groove, so that sliding of the protrusion in the inclined groove is facilitated.

It should be noted that a control part circuit of the direct-current speed regulation switch is integrated on one side, close to the push shaft 3, of the circuit board assembly 7, and the control part circuit comprises a capacitor, a resistor, an inductor, a thermistor, an LED output, a control integrated chip and an MOS transistor.

In one embodiment, the side, away from the push shaft 3, of the circuit board assembly 7 is provided with MOS transistor cooling fins.

In the embodiment, the MOS transistor cooling fins are mounted on the back face of the circuit board to achieve heat dissipation, heat can be effectively transmitted to the outside of the switch, and the possibility that a control circuit on the circuit board assembly is affected by heating of the MOS transistor is reduced as much as possible.

As shown in FIG. 1 to FIG. 3, the direct-current speed regulation switch also comprises a small cover 15, and the small cover 15 is clamped on the bottom cover 2 and is used for crimping the circuit board assembly.

In the embodiment, after the assembly is completed, the circuit board assembly is pressed by the small cover 15, so that electronic components are prevented from falling off due to vibration in the using process of the electric tool.

Preferably, after the circuit board assembly is pressed by the small cover, the circuit board can be fixed on the bottom cover by epoxy resin or silica gel, so that the electronic components can be further prevented from falling off due to vibration in the using process of the electric tool, and the service life of the switch is prolonged.

As shown in FIG. 3 and FIG. 4, the direct-current speed regulation switch also comprises a reset spring 16 and a positioning column 17 used for supporting the reset spring 16, and the reset spring 16 is arranged on the push shaft 3.

Preferably, semicircular grooves are formed in the base body 1 and the bottom cover 2, and the push shaft 3 is placed in the box body through a circular groove composed of the two semicircular grooves.

Preferably, as shown in FIG. 2 to FIG. 4, a dustproof cover 18 of the push shaft is further arranged between the box body composed of the base body 1 and the bottom cover 2 and the trigger.

It is understandable that a trigger 19 is arranged at the end, extending out of the box body composed of the base body and the bottom cover, of the push shaft in the embodiment.

Figure 5:
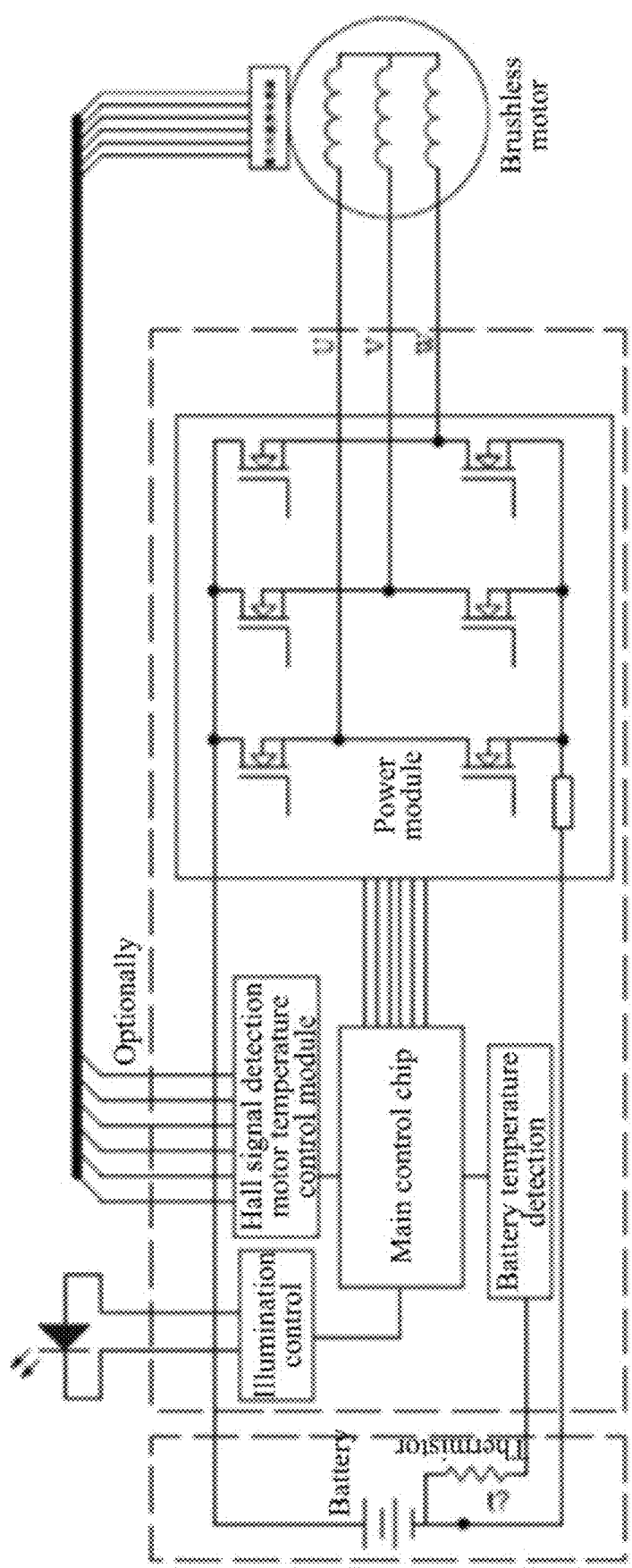
FIG. 5 is an electrical schematic diagram of a brushless direct-current speed regulation switch with a highly integrated structure in the present disclosure.

The electrical schematic diagram in the embodiment of the present disclosure is as shown in FIG. 5.

The present discourse provides a brushless direct-current speed regulation switch with a highly integrated structure. The working process is as follows:

When the trigger 19 is pressed, the push shaft 3 is driven by the trigger 19 to move to the left side, the push shaft 3 is gradually separated from pressing the tail part of the moving contact on the moving contact assembly 4, and under the action of the moving elastic sheet 5, the moving contact on the moving contact assembly 4 rotates anticlockwise by taking the contact point of the moving contact on the moving contact support 5 and the moving contact support 5 as a fulcrum, and a moving contact point on the moving contact assembly 4 is in contact with a static contact point on the static contact pin assembly 6, so that the switch-on function of the switch is realized. Meanwhile, the sliding sheet 10 is driven by the push shaft 3 to slide, so that the moving contact support and the static contact pin assembly 10 are connected, and the auxiliary switch-on function of the switch is realized.

When the push shaft 3 slides leftwards, the connecting reed 8 and the speed regulation reed 9 which are arranged on one side of the push shaft 3 are driven to slide leftwards on the circuit board assembly, and the connecting reed 8 is connected with two copper foils on the circuit board assembly 7, so that the circuit board assembly is electrified firstly, then the speed regulation reed 9 slides on a resistance tape, the output resistance on the circuit board assembly 7 is gradually reduced, a control integrated chip on the circuit board assembly 7 outputs a control signal of relevant speed regulation voltage rise, and the control signal is transmitted to the MOS transistor on the circuit board assembly 7, so that the electronic speed regulation voltage rise function of the switch is realized.

When the trigger 19 is loosened, the push shaft 3 is gradually reset under the action of the reset spring 16, the push shaft 3 slides to the right side to drive the connecting reed 8 and the speed regulation reed 9 to slide rightwards, the speed regulation reed 9 slides on the resistance tape, the output resistance on the circuit board assembly 7 is gradually increased, the control integrated chip on the circuit board assembly 7 outputs a control signal indicating that the speed regulation voltage is reduced, and the control signal is transmitted to the MOS transistor on the circuit board assembly 7, so that the electronic speed regulation and voltage reduction functions of the switch are realized; and finally, the connecting reed 8 slides on the circuit board assembly 7 and is disconnected from the two copper foils, so that a chip part on the circuit board assembly 7 is not electrified, the push shaft 3 presses the tail part of the moving contact on the moving contact assembly 4, the switch is disconnected, the circuit board assembly is completely not electrified, the switch has no output, and a switch-off function of the switch is realized.

When the reversing deflector rod 13 is shifted, the cylindrical protrusion 131 on the tail part of the reversing deflector rod 13 slides in the inclined groove 121 in the reversing sliding block 12, so that the reversing reed 20 on the reversing sliding block 12 is driven to slide on the copper foils on the circuit board assembly 7, resistance between the copper foils on the circuit board assembly 7 is different, and the control integrated chip outputs a reversing signal to the circuit board assembly 5. Therefore, the reversing function of the switch is realized.

According to the switch, various control and protection functions such as electronic speed regulation, battery over-temperature protection, motor over-temperature protection, over-current protection, under-voltage protection, electric quantity display and a signal line socket (programming interface) are integrated in the switch through the circuit board assembly.

The brushless direct-current speed regulation switch with a highly integrated structure does not need to be externally connected with other control boards, so that wires in the electric tool are very few, only two input wires, three output wires, an external battery temperature detection wire, an LED output wire and other output wires are needed, and the assembly process of the electric tool is greatly simplified. In addition, a signal line socket (programming interface) is also exposed out of the switch, and after a matched plug is plugged, program in the switch can be read and changed at any time, so that the program in the switch is very convenient to modify and read.

Finally, it should be noted that the above-mentioned embodiments are only used for illustrating the technical scheme of the present disclosure but not restricting the scope of protection of the present disclosure; although the present disclosure is described in detail by reference to a better embodiment, those ordinary skilled in the art should understand that the technical scheme of the present disclosure can be amended or equally substituted but not departing from the substance and scope of the technical scheme of the present disclosure.

What is claimed is:

1. A brushless direct-current speed regulation switch with a highly integrated structure, comprising a base body, a bottom cover and a push shaft, wherein one end of the push shaft is arranged in a box body composed of the base body and the bottom cover, and an other end of the push shaft extends out of the box body;
    a moving contact assembly in contact with the push shaft is arranged below the push shaft, a moving elastic sheet, a moving contact support for supporting the moving contact assembly and a static contact pin assembly matched with the moving contact assembly are arranged below the moving contact assembly, one end of the moving elastic sheet is connected with the moving contact assembly, and an other end of the moving elastic sheet is connected with the moving contact support;
    a circuit board assembly is arranged on one side of the push shaft, and a connecting reed and a speed regulation reed which is capable of sliding on the circuit board assembly are arranged on the one side, close to the circuit board assembly, of the push shaft; and
    the moving contact support and the static contact pin assembly are respectively welded with different welding spots on the circuit board assembly;
    wherein a sliding sheet capable of sliding on the moving contact support is arranged at a bottom of the push shaft, the sliding sheet is configured to achieve an auxiliary switch-on function, a moving spring is arranged between the sliding sheet and the push shaft, one end of the moving spring abuts against the sliding sheet, and an other end of the moving spring abuts against the push shaft;
    wherein two grooves are formed in the bottom of the push shaft, the two grooves are internally provided with respective clamping blocks, and two ends of the sliding sheet are clamped into the two grooves through the clamping blocks respectively, and a mounting hole is further formed in the bottom of the push shaft, and the other end of the moving spring extends into the mounting hole.

2. The brushless direct-current speed regulation switch according to claim 1, wherein a base body groove is formed, corresponding to a position between the moving contact assembly and the static contact pin assembly, on an outer side of the base body, and the base body groove is internally provided with a magnet.

3. The brushless direct-current speed regulation switch according to claim 1, wherein a reversing sliding block matched with the circuit board assembly is arranged above the push shaft, a reversing deflector rod matched with the reversing sliding block is arranged above the reversing sliding block, and a positioning elastic sheet matched with the reversing deflector rod is arranged at a tail part of the reversing deflector rod; and
    a reversing reed is arranged on a side, close to the circuit board assembly, of the reversing sliding block.

4. The brushless direct-current speed regulation switch according to claim 3, wherein an inclined groove is formed in the reversing sliding block, a protrusion is arranged at a bottom of the reversing deflector rod, and the protrusion is capable of sliding in the inclined groove; and
    a V-shaped groove is formed in the positioning elastic sheet, and an inverted hook matched with the V-shaped groove is arranged at the tail part of the reversing deflector rod.

5. The brushless direct-current speed regulation switch according to claim 1, wherein the brushless direct-current speed regulation switch further comprises a small cover, a reset spring and a positioning column used for supporting the reset spring; and
    the small cover is clamped on the bottom cover and is used for crimping the circuit board assembly, and the reset spring is arranged on the push shaft.

* * * * *